United States Patent
Ouchi et al.

(10) Patent No.: US 6,400,530 B1
(45) Date of Patent: Jun. 4, 2002

(54) COMPLEX MAGNETIC HEAD AND MANUFACTURING METHOD OF COMPLEX MAGNETIC HEAD CORE

(75) Inventors: Hirofumi Ouchi; Toshihisa Obuse; Yoshio Kasuga; Tatsunori Hibara; Masao Kouhashi; Kouichi Yamada; Seiichi Handa; Hiromasa Ishii; Seiichi Watanabe, all of Tokyo (JP)

(73) Assignee: Mitsubishi Denki K.K., Tokyo (JP)

( * ) Notice: Subject to any disclaimer, the term of this patent is extended or adjusted under 35 U.S.C. 154(b) by 0 days.

(21) Appl. No.: 09/325,753

(22) Filed: Jun. 4, 1999

Related U.S. Application Data

(62) Division of application No. 09/004,288, filed on Jan. 8, 1998, now Pat. No. 6,088,909.

(30) Foreign Application Priority Data

Mar. 14, 1997 (JP) .............................................. 9-060411

(51) Int. Cl.[7] .............................. G11B 5/60; G11B 5/29
(52) U.S. Cl. .................................... 360/234.9; 360/235
(58) Field of Search ................................ 360/125, 121, 360/234.8, 234.9, 235, 234.7

(56) References Cited

U.S. PATENT DOCUMENTS

| | | | |
|---|---|---|---|
| 5,309,306 A | | 5/1994 | Okada et al. |
| 6,034,846 A | * | 3/2000 | Ouchi et al. ................ 360/121 |
| 6,088,909 A | * | 7/2000 | Ouchi et al. ............. 29/603.16 |

FOREIGN PATENT DOCUMENTS

| | | | |
|---|---|---|---|
| JP | A-63103408 | | 5/1988 |
| JP | A-2189706 | | 7/1990 |
| JP | A-3263602 | | 11/1991 |
| JP | 6-36222 | * | 2/1994 |
| JP | 6-36227 | * | 2/1994 |
| JP | 6-282811 | * | 10/1994 |

OTHER PUBLICATIONS

Yamamoto, et al., "120MB Large Capacity Floppy Disk Drive with Backward R/W Compatibility," Technical Report of IEICE MR95–68 (1995–12) pp. 1–8.

* cited by examiner

*Primary Examiner*—William Klimowicz
(74) *Attorney, Agent, or Firm*—Birch, Stewart, Kolasch & Birch

(57) ABSTRACT

A method for manufacturing a magnetic head core of a complex magnetic head includes binding a first core material of a U-shaped cross section and a second core material of a flat plate shape to form a tubular core material having two bonded portions between the first and second core materials. Then a plurality of grooves are formed in the tubular core material across one of the bonded portions to form a plurality of track surfaces. The grooves are then filled with a fused glass material, and the other of the bonded portions is removed to form a substantially U-shaped core block having a plurality of track surfaces separated by the glass-filled grooves. The U-shaped core block is then sliced along each of the grooves to obtain a plurality of magnetic head cores. A complex magnetic head manufactured by the method is also disclosed.

7 Claims, 9 Drawing Sheets

FIG. 16a
PRIOR ART
FIG. 16b
PRIOR ART
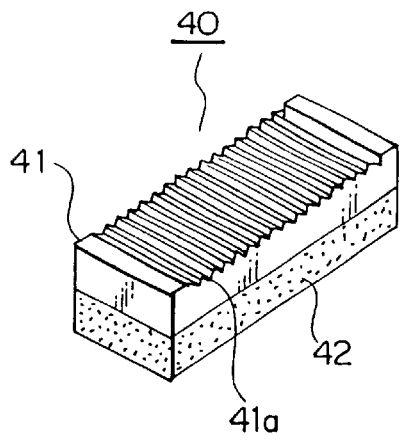
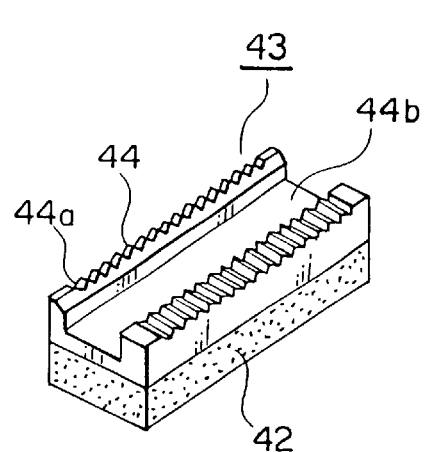
FIG. 16c
PRIOR ART
FIG. 16d
PRIOR ART
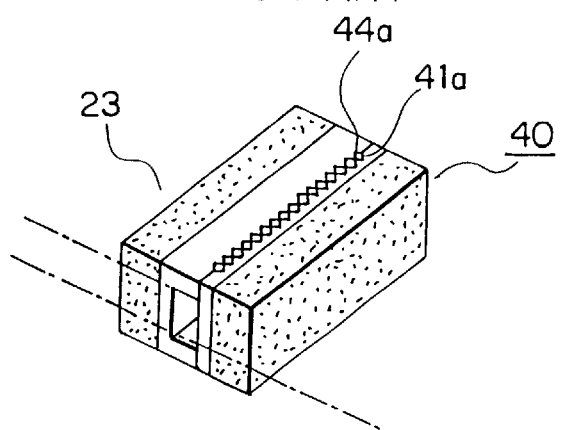
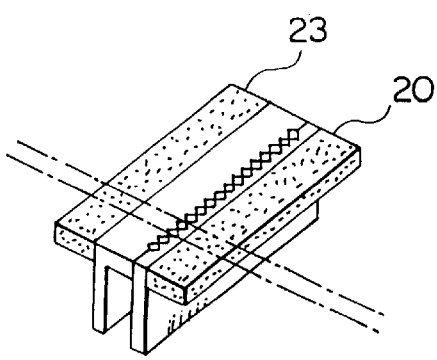
FIG. 16e
PRIOR ART
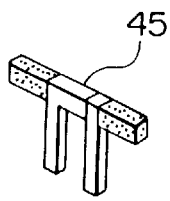

COMPLEX MAGNETIC HEAD AND MANUFACTURING METHOD OF COMPLEX MAGNETIC HEAD CORE

This application is a divisional of co-pending application Ser. No. 09/004,288, filed on Jan. 8, 1998, now U.S. Pat. No. 6,088,909, the entire contents of which are hereby incorporated by reference.

BACKGROUND OF THE INVENTION

This invention relates to a complex magnetic head and a method for manufacturing a magnetic head core of a complex magnetic head and, more particularly, to a complex magnetic head for use in a floppy disk drive (hereinafter referred to as FDD) in which a high recording density head core (hereinafter referred to as a first head core) and a low recording density head core (hereinafter referred to as a second head core) are combined in a unitary structure and a method for manufacturing a complex magnetic head core.

The magnetic head for use in an FDD includes a complex magnetic head in which two head cores of different recording densities are combined into a unitary structure. This is because there are two types of floppy disc (hereinafter referred to as FD) as a recording medium, i. e., a high density FDD of 120 Mbytes and a low density FDD of less than 2 Mbytes and different head cores are needed for writing and reading these two different types of FD with a common FDD unit.

FIG. 15 illustrates a complex magnetic head disclosed in Japanese Patent Laid-Open No. 63-103468, in which reference numeral 1 is a complex magnetic head, 2 is a first head core, 21 is a first RIW core, 22 is a first R/W gap, 23 is a first erase core and 24 is a first erase gap. Reference numeral 3 is a second head core, 31 is a second R/W core, 32 is a second R/W gap, 33 is a second erase core and 34 is a second erase gap. Reference numeral 4 is a slider.

In order to manufacture the complex magnetic head 1, the first head core 2 and the second head core 3 are separately prepared. Then, the first head core 2 and the second head core 3 are bonded together with the slider 4 interposed therebetween. At this time, the first head core 2, the second head core 3 and the slider 4 are bonded together with an appropriate positioning so that the first R/W gap 22, the first erase gap 24 and the like have appropriate gap depths (not shown).

One example of a method for preparing a head core will now be described. FIGS. 16a to 16e are views explaining the manufacturing method for the head core disclosed in Japanese Patent Laid-Open No. 3-263602. The head core manufactured by this method is different from the first head core 2 or the second head core 3 shown in FIG. 15 in terms of configuration but is substantially the same in terms of its function. In the figures, reference numeral 40 is a first core material, 41 is a first magnetic base plate provided with first gap grooves 41 a and 42 is a non-magnetic base plate. Also, reference numeral 43 is a second core material, 44 is a second magnetic base plate provided with second gap grooves 44a and coil grooves 44b. Reference numeral 45 is a chip-shaped head core prepared by this process.

First, the first core material 40 of FIG. 16a and the second core material 43 of FIG. 16b are joined with their first gap grooves 41a and the second gap grooves 44a positioned in aligned opposition with each other so that a series of holes is formed between the first and second core materials 40 and 43 as shown in FIG. 16c. These holes defined by the first and the second gap grooves 41a and 44a are then filled with a fused glass material (not shown). As illustrated in FIG. 16c, the assembly is cut along dot-and-dash lines into the configuration illustrated in FIG. 16d, which then is sliced along dot-and-dash lines shown in FIG. 16d to obtain a head core 45 shown in FIG. 16e.

When the head core is to be manufactured by the above-described conventional process shown in FIGS. 16a to 16e, a displacement can be easily generated between the first gap grooves 41a and the second gap grooves 44a when the first core material 40 and the second core material 43 are bonded and the track surfaces of the head core manufactured are often out of alignment. This misalignment may not cause any problem for the second head core for the low density FDD which has a track width of 125 $\mu$m, but can significantly affect the recording and reproducing operation of the high density FDD which has a track width of 8 $\mu$m. That is, when the first head core 2 is manufactured by the conventional process illustrated in FIG. 16, many of head cores manufactured have the above-mentioned fatal track misalignment, resulting in a low yield.

Upon manufacturing the complex magnetic head 1 shown in FIG. 15, the first head core 2, the second head core 3 and the slider 4 are to be bonded to each other with an appropriate positioning so that the first R/W gap 22, the first erase gap 24 and the like have appropriate gap depths (not shown), so that the fine positional adjustments which are complicated and difficult must be achieved, lowering the productivity of the magnetic head.

SUMMARY OF THE INVENTION

Accordingly, one object of the present invention is to provide a complex magnetic head free from the above-discussed problems of the conventional design.

Another object of the present invention is to provide a complex magnetic head in which no track surface displacement are generated.

Another object of the present invention is to provide a complex magnetic head in which gap depth of the head core can be easily controlled.

A further object of the present invention is to provide a method for manufacturing a magnetic head core of a complex magnetic head free from the above-discussed problems of the conventional technique.

With the above objects in view, the present invention resides in a method for manufacturing a magnetic head core of a complex magnetic head, comprising the steps of binding a first core material of a U-shaped cross section and a second core material of a flat plate shape to form a tubular core material having two bonded portions between the first and second core materials. Then, a plurality of grooves are formed in the tubular core material across one of the bonded portions to form a plurality of track surfaces. The grooves are then filled with a fused glass material, and the other of the bonded portions is removed to form a substantially U-shaped core block having a plurality of track surfaces separated by the glass-filled grooves. The U-shaped core block is then sliced along each of the grooves to obtain a plurality of magnetic head cores.

The step of filling the grooves with the glass material may include the step of forming a chromium layer on surfaces of the plurality of grooves before filling the grooves with the glass material to expedite the fusion of the glass material. The chromium layer may have a thickness of from 50 $\mu$m to 300 $\mu$m.

The glass material may be a powder glass to expedite the fusion of the glass material or may be in a ladder shape and may be applied with the track surfaces received within its openings.

The step of filling the grooves with the glass material includes the step of placing a head support member on a side surface of the core materials and binding the head support member with the core materials by the fusion of a glass material, and wherein the step of cutting the U-shaped core block along each of the grooves into a plurality of magnetic head cores includes the step of cutting the head support member upon the cutting of the U-shaped core block to provide a head support for the head core.

A complex magnetic head of the present invention comprises a planar base reference plate for providing a reference position, a first head core provided at its side portion with a first support portion positioned with respect to the reference plate and having provided at its leg portion with a first space portion, a first coil portion accommodated within the first space portion, a second head core provided at its side portion with a second support portion positioned with respect to the reference plate and having provided at its leg portion with a second space portion, a second coil portion accommodated within the second space portion, and a holder disposed between the first head core and the second head core, having its bottom portion mounted on the reference plate, having one of its side surfaces joined to the first support portion and having the other of its side surfaces joined to the second support portion, for holding the first head core and the second head core. The first support portion is joined to one of the side surfaces of the holder which extends for a predetermined length from a predetermined position of the reference plate, and the second support portion is joined to the other of the side surfaces of the holder which extends for a predetermined length from a predetermined position of the reference plate.

At least one of the first head core and the second head core may be provided with the head core manufactured by the above process and have a head support portion.

The side surfaces may have respective groove thereon to control the intrusion of a bonding agent bonding the holder to a first positioning portion and a second positioning portion.

The first coil portion and the second coil portion may be formed in an integral unitary structure.

The plurality of coil terminals provided at least on the first coil portion may be arranged in parallel to the direction of rotation of a magnetic disc.

The first holder may be provided with a hole portion made by a projection on a molding die for manufacturing the first holder or by a laser beam.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more readily apparent from the following detailed description of the preferred embodiments of the present invention taken in conjunction with the accompanying drawings, in which:

FIG. 8b is a side view of the assembly of FIG. 8a;

FIGS. 16a to 16e are perspective views illustrating the steps of the conventional method for manufacturing a magnetic head core of a complex magnetic head.

DESCRIPTION OF THE PREFERRED EMBODIMENTS

Figure 1A:
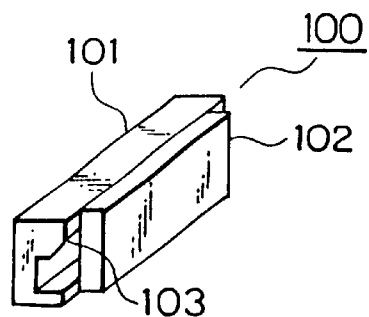
FIGS. 1a to 1e are perspective views illustrating the steps of manufacturing the complex magnetic head core of the present invention.
Figure 1B:
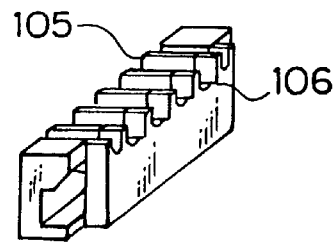
Figure 1C:
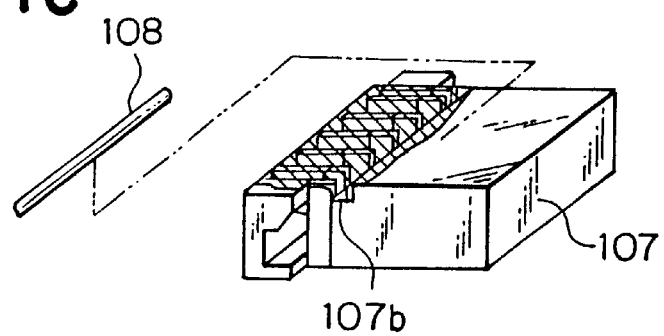
Figure 1D:
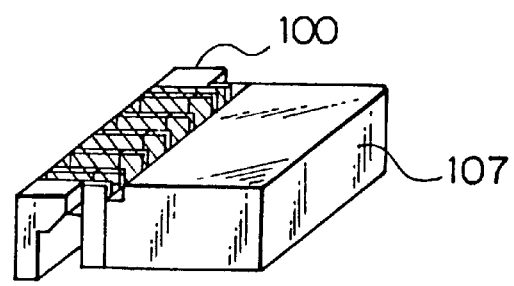
Figure 1E:
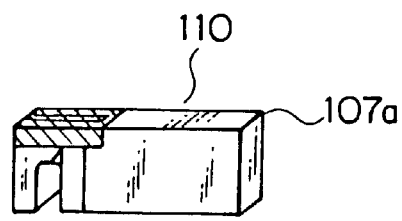

FIGS. 1a to 1e are perspective views illustrating the steps of manufacturing the complex magnetic head core of the present invention. In these figures, reference numeral 100 is a core material formed by bonding a first core material 101 and a second core material 102 with a fusion glass 103. Also, 105 are track surfaces, 106 are grooves and 107 is a head holder material from which a head holder 107a for supporting the head as shown in FIG. 1e. 107b is a glass material placing portion on which a glass material 108 is to be placed. It is to be noted that the illustrated method for manufacturing a head core of a complex magnetic head equally applies to either of the first head core and the second head core.

In order to manufacture a head core 110 shown in FIG. 1e, the first core material 101 and the second core material 102 made such as of monocrystaline ferrite are bonded by the fused glass 103 at a temperature of 500–600° C. as shown in FIG. 1a to obtain the core material 100. Then, in order to form a plurality of track surfaces 105 in the core material 100 as shown in FIG. 1b, the grooves 106 are formed by a grinder (not shown) such as a diamond blade. Then, the head holder material 107 made of ceramics for example is preliminarily attached to the core material 100 by a suitable jig (not shown) as shown in FIG. 1c.

A rod-shaped glass material 108 is placed on the glass placing portion 107b and heat it to a temperature of about 500° C. to melt it to fill the groove 106 and bind the head holder material 107 to the core material 100 with the fused glass material 108. Then, the excessive glass material 108 that comes out of the groove 106 is removed by abrasion, and the joint portion of the leg portion of the head core is removed by grinding into the configuration shown in FIG. 1d. Then, the core material 100 and the head holder material 107 bind as shown in FIG. 1d is sliced at each of the grooves 106 to form the first head core 110 having a head holder 107a as shown in FIG. 1e.

According to the above method, the grooves 106 are formed after the first core material 101 and the second core material 102 are bind together, so that the displacement of the tracking surface 105 does not occur and the manufacturing yield of the head core 110 can be improved. Also, when the first and the second head cores are to be manufactured by the above method, they can be manufactured by the same facility, so that the management of the manufacturing steps is easy and the production cost can be reduced.

Figure 2:
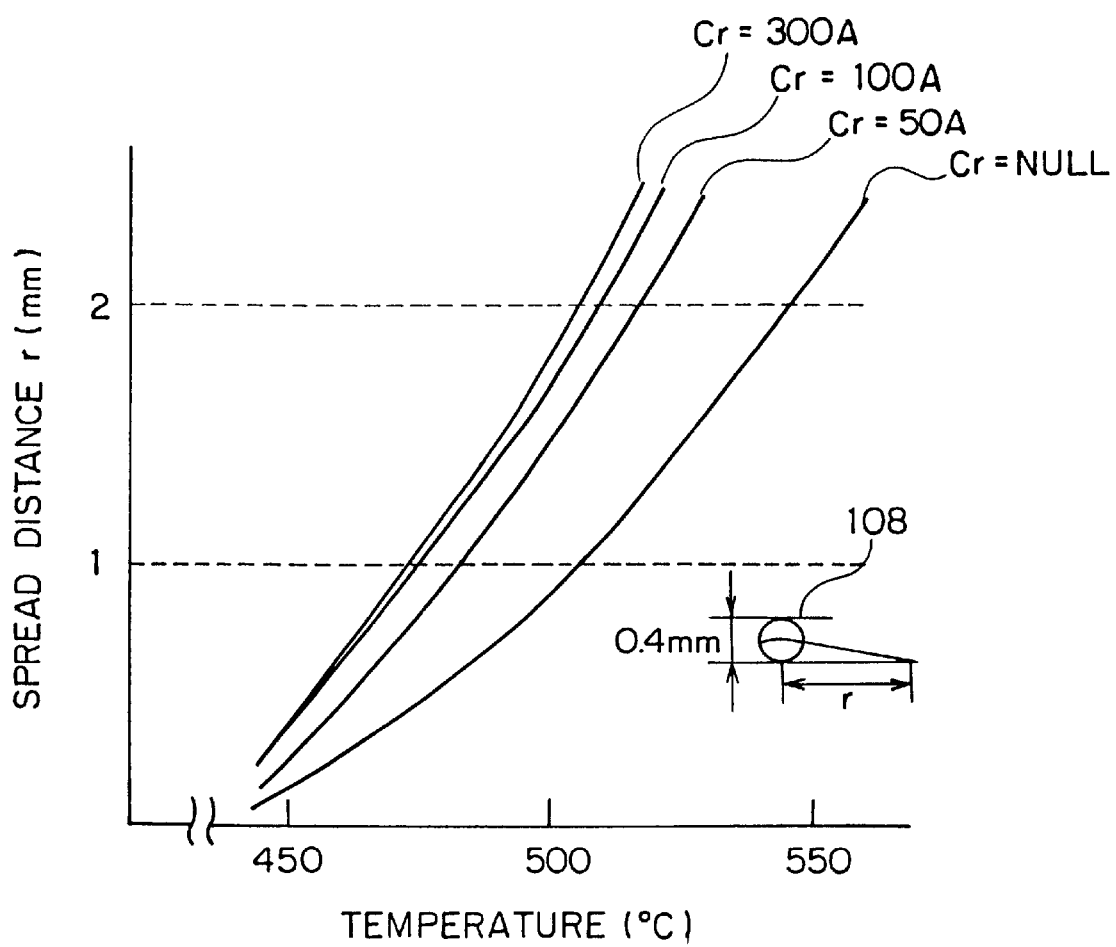
FIG. 2 is a graph showing the wettability of a glass material plotted against the temperature change when a chromium layer of different thickness is formed on the groove in the core material.

Also, it is advantageous to form a chromium layer by the spattering or the like in the grooves 106 in the manufacturing step shown in FIG. 1b because the wettability of the glass material 108 to be fused onto the grooves 106 is improved and easy to spread, allowing the fusion within a short time. FIG. 2 is a graph showing the wettability expressed as the distance of spread of a glass material 108 having a diameter of 0.4 mm (shown in abscissa) plotted against the temperature change (shown in coordinate) when a chromium layer of different thickness is formed on the groove 106 in the core material. It is seen from FIG. 2 that when there is no chromium layer, the spread distance is 1 mm at a fusion temperature of about 510° C. when there is no chromium layer, whereas the spread distance of 1 mm is attained at a fusion temperature of about 480° C. when a chromium layer of 50 Å is provided. It is to be noted that the length of the tracking surface 105 shown in FIG. 1b is about 1 mm and therefore a fusion temperature which can attain the spread distance of about 1 mm is needed.

That is, when the fusion temperature is the same, the fusion time with a chromium layer of 50 Å is shorter than the fusion time with no chromium layer, improving the productivity. The thickness of the chromium layer formed in the groove 106 is proportional to the spattering time. Also, it is seen from FIG. 2 that the spread distance is not very much different between that when the chromium layer is 100 Å thick and that when the chromium layer is 300 Å, and no substantial change is observed even when the chromium layer thickness is made more than 300 Å as compared to when it is 300 Å thick. That is, with the total of the spattering time and the fusion time taken into consideration, the thickness of the chromium layer for improving the productivity is optimum in the range of from 50 to 300 Å.

Thus, when the chromium layer of a thickness of from 50 to 300 Å is formed in the groove 106, the time for the glass material 108 to be fused in the groove 106 is shortened, improving the productivity. In order to improve the wettability of the glass material 108 to be fused in the groove 106 to make it more easily spreadable, a layer of silicon oxide ($SiO_2$) may be used in stead of the chromium layer.

Figure 3:
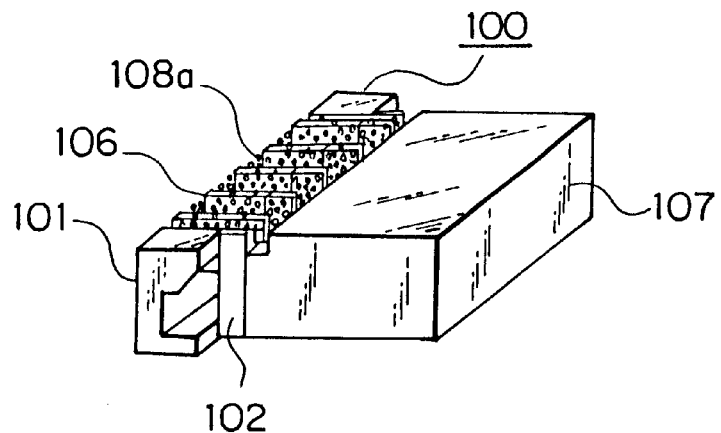
FIG. 3 is a perspective view illustrating how the powder glass material is applied to the grooves of the core material.
Figure 4:
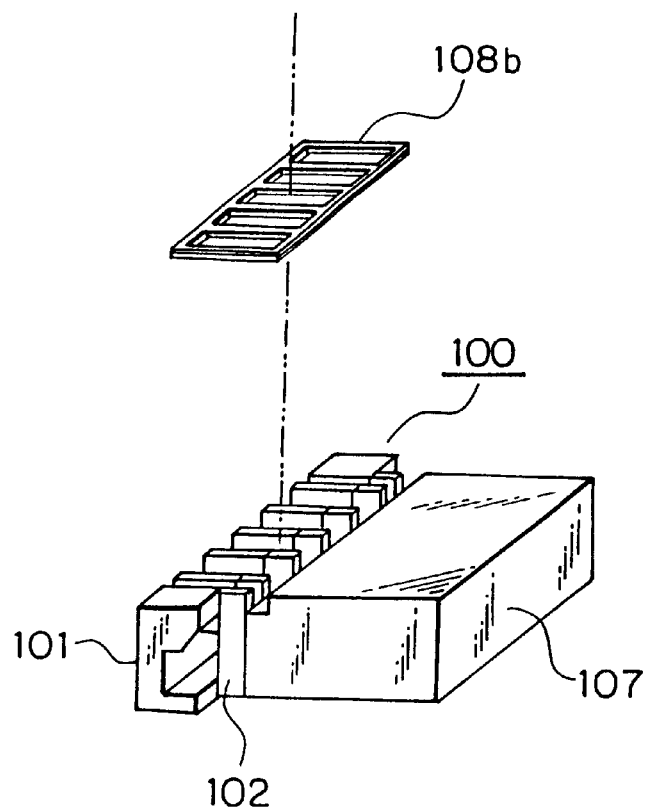
FIG. 4 is a perspective view illustrating how the ladder-shaped glass material is applied to the grooves of the core material.

While the groove 106 is filled with the fused glass through the use of the rod-shaped glass material shown in FIG. 1c in the above embodiment, the fusion bonding may be achieved by using a glass material of another shape, such as a glass material 108a in the form of powder as shown in FIG. 3 or a glass material 108b in the shape of a ladder as shown in FIG. 4.

According to the method shown in FIG. 3, the powder glass material 108a is sprayed evenly over the groove 106 and then fused, so that the fusion bonding can be achieved within a time period shorter than that with the rod-shaped glass material 108 even when the wettability of the glass is not very good, thus improving the productivity. Also, since the ladder-shaped glass material 108b is solid and has a definite configuration, handling of the material is easy.

Figure 5:
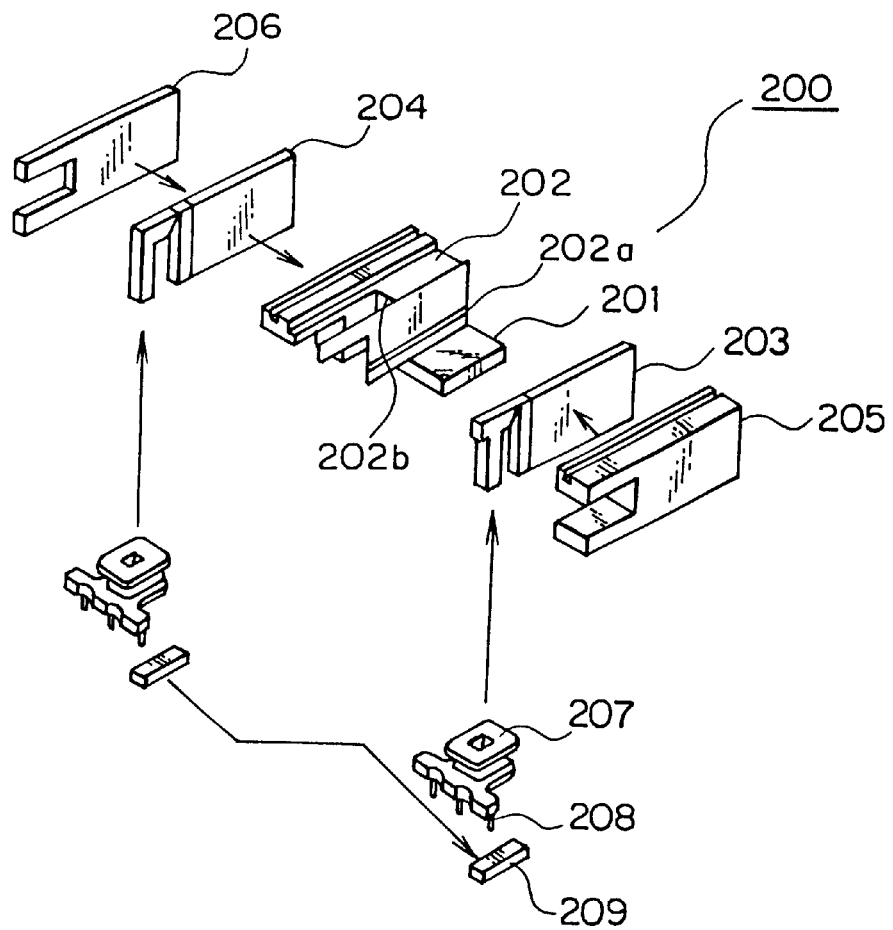
FIG. 5 is an exploded perspective view showing the steps of manufacturing the complex magnetic head core of the present invention.

FIG. 5 is an exploded perspective view showing the steps of manufacturing the complex magnetic head core of the present invention, in which reference numeral 200 is complex magnetic head, 201 is a reference base plate, 202 is a first holder having formed therein a cut groove 202a and a notch portion 202b, 203 is a first head core, 204 is a second head core, 205 is a second holder, 206 is a third holder, 207 is a coil, 208 is a coil terminal and 209 is a back core.

Figure 6:
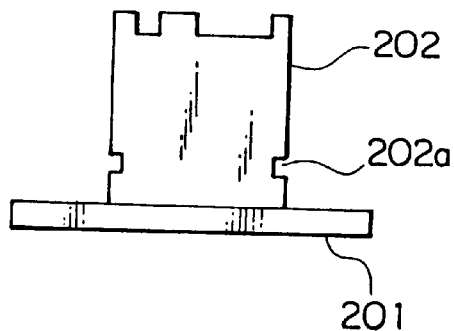
FIG. 6 is a rear view showing the shape of the cut groove of the first holder.
Figure 7:
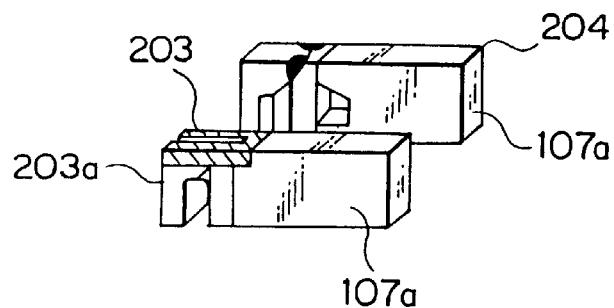
FIG. 7 is a perspective view of the first head core and the second head core for use in another complex magnetic head of the present invention.

FIG. 6 is a rear view showing the shape of the cut groove 202a of the first holder 202 and FIG. 7 is a perspective view of a first head core 203 and a second head core 204. It is to be noted that the tip of the first head core 203 is provided with a notch portion 203a for use in adjusting the dimension when mounting the coil 207 thereon. This notch portion 203a is formed, during the manufacture of the head core shown in FIG. 1, simultaneously by a grinder (not shown) when the joint portion of the leg portion of the head core material 100 is removed by grinding as shown in FIG. 1d.

Figure 8A:
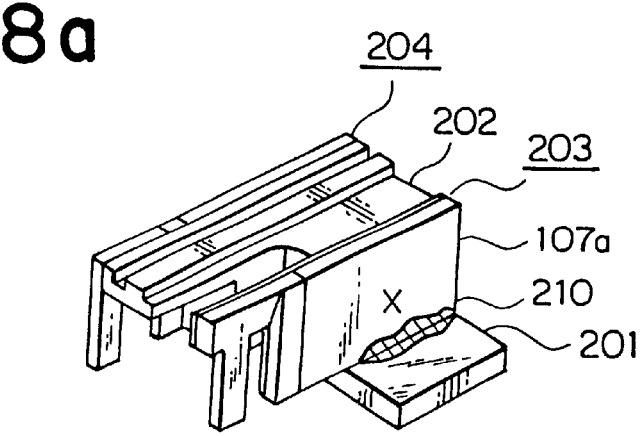
FIG. 8a is a perspective view of the base reference plate and the head cores showing how they are positioned with respect to each other.
Figure 8B:
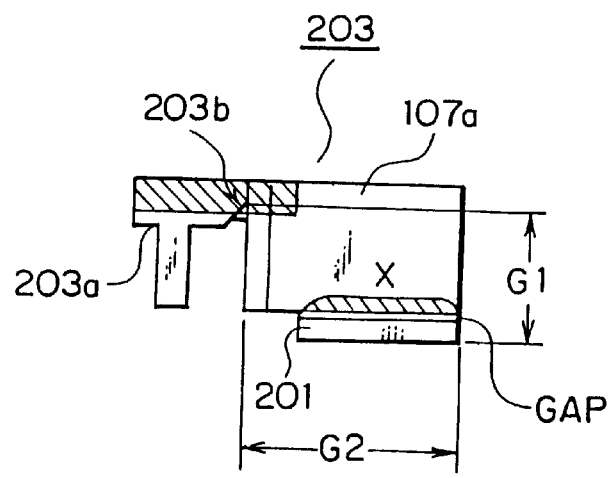
Figure 9:
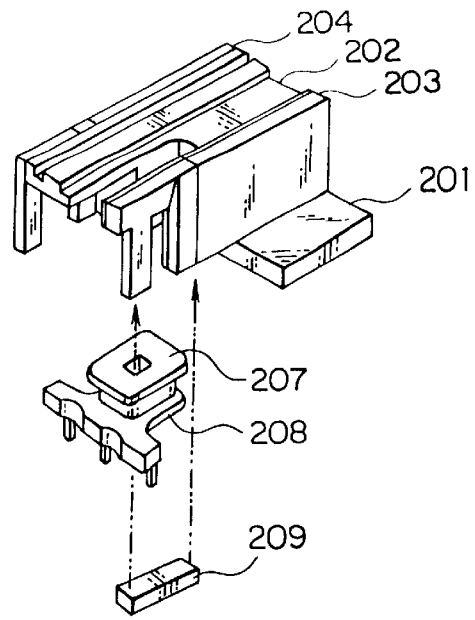
FIG. 9 is an exploded perspective view showing how the coil terminal and the back-up core are mounted to the first head core.

In the method for manufacturing the complex magnetic head of this example, it is necessary that the head holder 107a be provided together with the first head core 203 and the second head core 204. Also, FIGS. 8a and 8b are a perspective view and a side view, respectively, of an assembly of the base reference plate 201 and the first head core 203 showing how they are positioned to each other. In these figures, reference numeral 203a is a gap top portion which is subject to positioning, 210 is an instantaneous bonding agent used in provisional fixing. Also, FIG. 9 is an exploded perspective view explaining how the coil 207, the coil terminal 208 and the back-up core 209 are mounted to the first head core 203.

Firstly, the first holder 202 provided which is the reference base plate 201 provided with the cut groove 202a and the notch portion 202b is secured as shown in FIG. 8a. If desired, the first holder 202 may be integrally formed as a unitary structure with the reference base plate 201. Also, in the complex magnetic head in general, an optical detection head (not shown) is used in the track positioning of the FD (not shown). The cut groove 202b is provided in order to allow the light from the optical detection head to pass through. Then, as shown in FIGS. 8a and 8b, the head holder 107a of the first head core 203 is placed on the reference base plate 201 and provisionally secured by an instantaneous bonding agent 210.

In this case, it is to be noted that the production yield can be effectively improved by precisely setting the distance G1 between the bottom surface of the reference base plate 201 and the gap top portion 203a shown in FIG. 8b. Therefore, in this embodiment, the positioning is carried out in precision relative to the distance G1. Also, since the bonding agent 210 reaches between the first holder 202 and the head holder 107a of the first head core 203 to bond the head holder 107a to the first holder 202, a gap that is generated between the reference base plate 201 and the head holder 107a causes no problem. While positioning must be carried out by taking the distance G2 from the side portion of the reference base plate 201 to the gap top portion 203a into consideration, since an error of the distance G2 of the order of ±20 μm may be allowed, the positioning do not have to be very precise.

Figure 10:
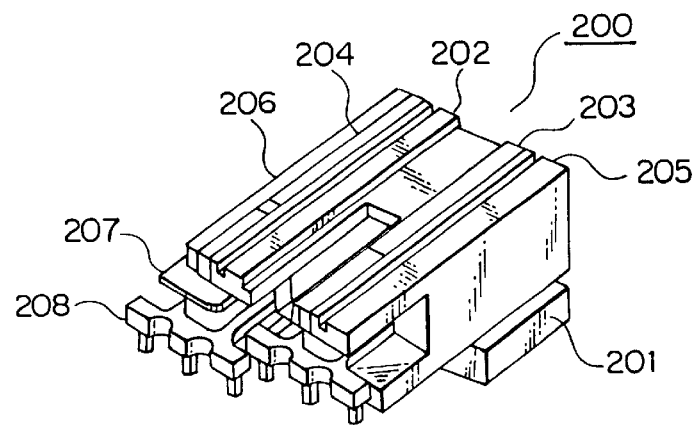
FIG. 10 is a perspective view illustrating the external appearance of the complex magnetic head assembled by the method for manufacturing the complex magnetic head of the present invention.
Figure 11:
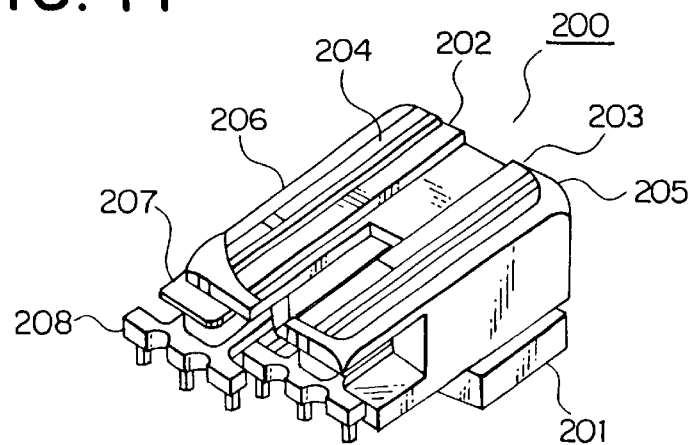
FIG. 11 is a perspective view illustrating the external appearance of the complex magnetic head manufactured by the method for manufacturing the complex magnetic head of the present invention.

FIG. 10 is a perspective view illustrating the external appearance of the complex magnetic head 200 assembled by the above-described method. Then, an epoxy resin bonding agent is applied to the each bonding portion of the complex magnetic head 200 and heated for complete bonding. Then, the sliding surface of the complex magnetic head 200 is abraded and then the side portion of the sliding surface is R-abraded to obtain the complex magnetic head 200 as shown in FIG. 11 to complete the manufacturing.

The above-described manufacturing method is characterized in that the head holder 107a is disposed on the side surfaces of the first head core 203 and the second head core 204 and that the magnetic head portions of the first head core 203 and the second head core 204 are supported by the reference base plate 201 and the head holder 107a. That is, the head holder 107a supports the magnetic head portions of the first head core 203 and the second head core 204 to position them relative to the reference base plate 201, so that the positioning can be achieved without giving an undesirable effect on the magnetic head portions. Also, since the head holder 107a supports the magnetic head portions of the first head core 203 and the second head core 204 and the leg portion is provided with a space into which the coil 207 can be inserted, the coil 207 can be easily inserted into the leg portion of the first head core 203 and the second head core 204, making the manufacture easy and decreasing the yield, resulting in improvements in the productivity.

Figure 12:
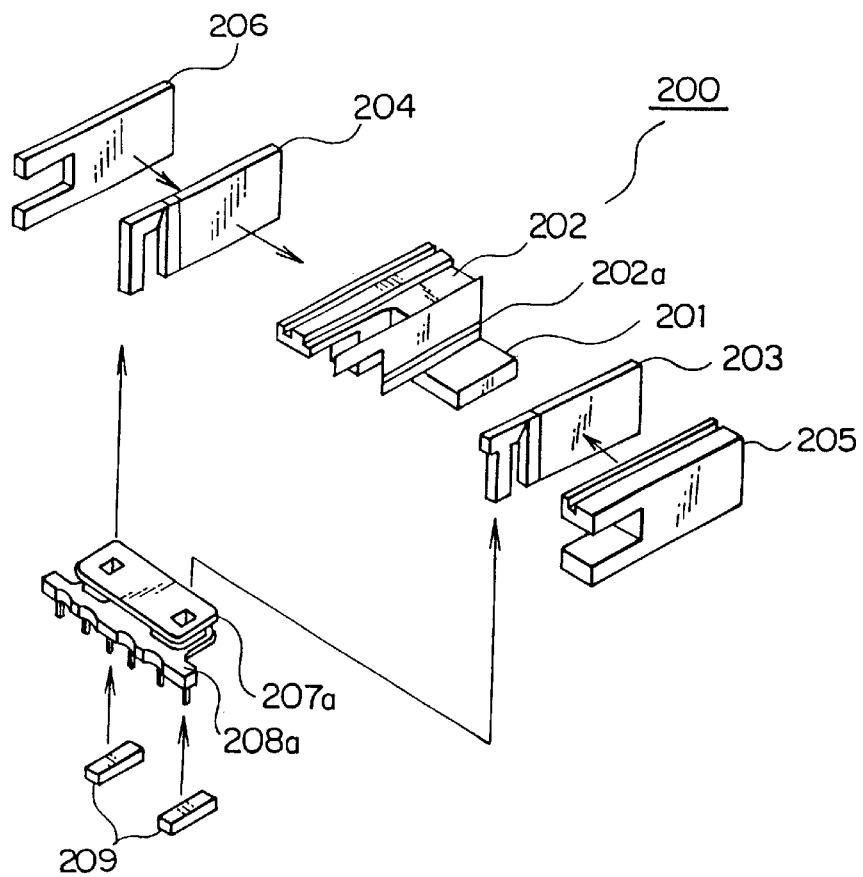
FIG. 12 is an exploded perspective view showing the steps of manufacturing the complex magnetic head core of the present invention.

FIG. 12 is an exploded perspective view showing another complex magnetic head of the present invention, in which the same reference numerals used in FIG. 5 designate identical or corresponding components and their explanations are omitted. In the figure, 200a is a complex magnetic head, 207a is a magnetic coil of an integral type mounted to the first head core 203 and the second head core 204 and 208a is a coil terminal of an integral type mounted to the magnetic coil 206a.

As shown in FIG. 12, the magnetic coil and the coil terminal mounted to the first head core 203 and the second head core 204 are formed into an integral and unitary structure as in the magnetic core 207a and the coil terminal 208a, the number of the components can be decreased and the productivity can be improved.

Figure 13:
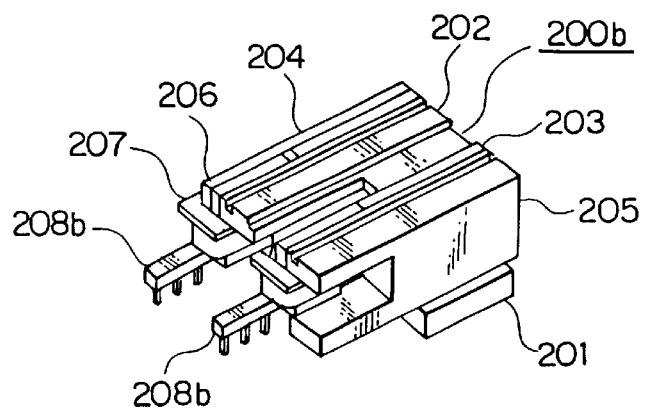
FIG. 13 is a perspective view showing another step of manufacturing the complex magnetic head core of the present invention.

FIG. 13 is a perspective view showing another complex magnetic head of the present invention, in which the same reference numerals used in FIG. 10 designate identical or corresponding components and their explanations are omitted. In the figure, 200b is a complex magnetic head, which is different in the configuration of the coil terminal 208b from the complex magnetic head 200 shown in FIG. 10.

Generally, the distance between the coil terminals necessary for winding wires on the coil terminals is at least 1 mm. If this distance is less than 1 mm, winding is difficult and the production efficiency and the yield are decreased and the cost is increased. Also, since the distance between the first head core 203 and the second head core 204 are usually set to be 2 mm, it is difficult to provide a distance of equal to or more than 1 mm between the coil terminals 207 shown in FIG. 10.

Accordingly, in the embodiment illustrated in FIG. 13, the coil terminals 208b are arranged in the direction parallel to the direction of rotation of the FD (not shown). In this arrangement, the distance between the coil terminals can be made equal to or more than 1 mm, so that the winding is easy and the cost increase can be suppressed.

Figure 14:
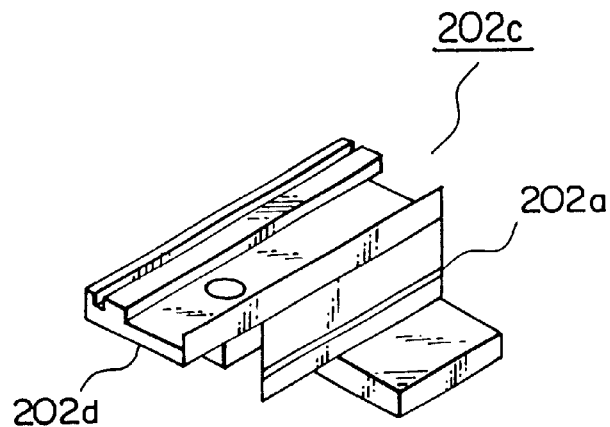
FIG. 14 is a perspective view showing another step of manufacturing the complex magnetic head core of the present invention.
Figure 15:
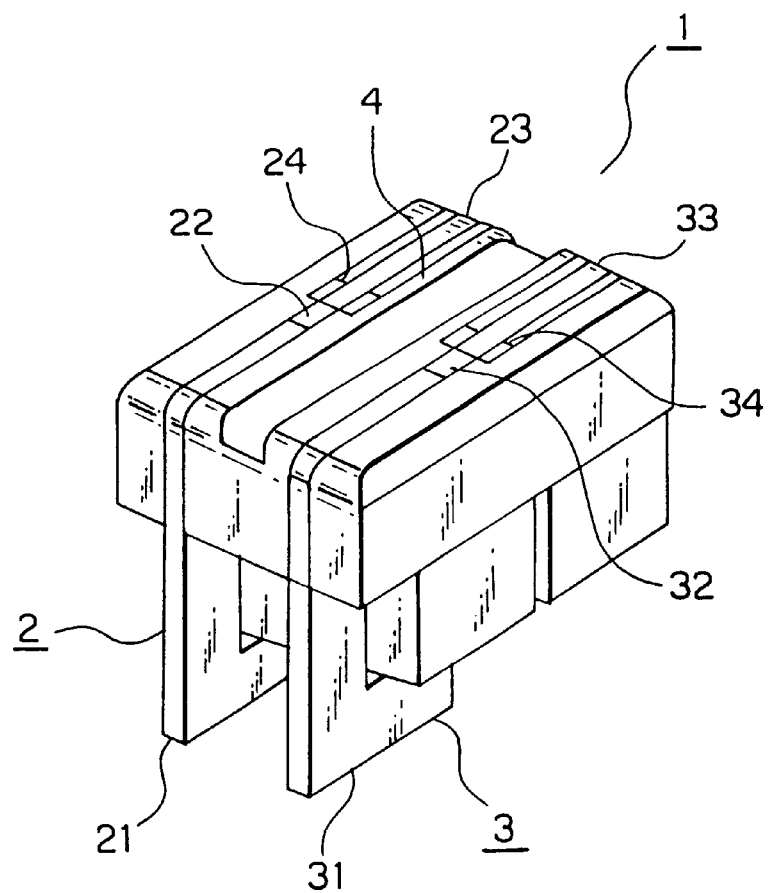
FIG. 15 is a perspective view of a conventional complex magnetic head.

FIG. 14 is a perspective view showing another complex magnetic head of the present invention. In the figure, reference numeral 202c is a first holder and 202d is a hole formed instead of the notched portion 202b shown in FIG. 5. The hole 202d may be formed by a projection provided on a casting die (not shown) for manufacturing the first holder 202c or by laser machining by an excimer laser or the like (not shown) after the fist holder 202c has been formed.

As has been described, the method for manufacturing a magnetic head core of a complex magnetic head of the present invention comprises the steps of binding a first core material of a U-shaped cross section and a second core material of a flat plate shape to form a tubular core material having two bonded portions between the first and second core materials. Then, a plurality of grooves are formed in the tubular core material across one of the bonded portions to form a plurality of track surfaces. The grooves are then filled with a fused glass material, and the other of the bonded portions is removed to form a substantially U-shaped core block having a plurality of track surfaces separated by the glass-filled grooves. The U-shaped core block is then sliced along each of the grooves to obtain a plurality of magnetic head cores. Therefore, no shift of the tracking surface occurs and the yield of the magnetic head core can be improved.

The step of filling the grooves with the glass material may include the step of forming a chromium layer on surfaces of the plurality of grooves before filling the grooves with the glass material to expedite the fusion of the glass material, so that the fusion bonding can be achieved within a short time, improving the productivity.

The chromium layer may have a thickness of from 50 μm to 300 μm, so that the total time of spattering time for forming the chromium layer and for the fusion bonding may be shortened, further improving the productivity.

In the method for manufacturing a magnetic head core of a complex magnetic head of the present invention, the glass material may be a powder glass to expedite the fusion of and raise the glass material, the productivity of the manufacturing process.

In the method for manufacturing a magnetic head core of a complex magnetic head of the present invention, the glass material may be in a ladder shape and may be applied with the track surfaces received within its openings to expedite the fusion of the glass material, the productivity is high and the handling of the glass material is easy.

Also, in the method for manufacturing a magnetic head core of a complex magnetic head of the present invention, the step of filling the grooves with the glass material includes the step of placing a head support member on a side surface of the core materials and binding the head support member with the core materials by the fusion of a glass material, and wherein the step of cutting the U-shaped core block along each of the grooves into a plurality of magnetic head cores includes the step of cutting the head support member upon the cutting of the U-shaped core block to provide a head support for the head core, so that the head core with a head support portion can be formed.

Further, the complex magnetic head of the present invention comprises a planar base reference plate for providing a reference position, a first head core provided at its side portion with a first support portion positioned with respect to the reference plate and having provided at its leg portion with a first space portion, a first coil portion accommodated within the first space portion, a second head core provided at its side portion with a second support portion positioned with respect to the reference plate and having provided at its leg portion with a second space portion, a second coil portion accommodated within the second space portion, and a holder disposed between the first head core and the second head core, having its bottom portion mounted on the reference plate, having one of its side surfaces joined to the first support portion and having the other of its side surfaces joined to the second support portion, for holding the first head core and the second head core. Therefore, the first coil portion and the second coil portion can be easily inserted into the leg portions of the first head core and the second core, respectively, the manufacture is easy and the yield is high, improving the productivity.

Also, in the complex magnetic head of the present invention, at least one of the first head core and the second head core may be provided with the head core manufactured by the above process and have a head support portion, so that the positioning can be easy.

Also, in the complex magnetic head of the present invention, the side surfaces may have a respective groove thereon to control the intrusion of a bonding agent bonding the holder to a first positioning portion and a second positioning portion, so that the bonding can be achieved easily.

Also, in the complex magnetic head of the present invention, the first coil portion and the second coil portion may be formed in an integral unitary structure, so that the number of component parts is decreased and the productivity is improved.

Also, in the complex magnetic head of the present invention, the plurality of coil terminals provided at least on the first coil portion may be arranged in parallel to the direction of rotation of a magnetic disc, the distance between the coil terminals can be made large to make the winding easy.

Also, in the complex magnetic head of the present invention, the first holder may be provided with a hole portion made by a projection on a molding die for manufacturing the first holder, so that the hole portion can be made easily.

Also, in the complex magnetic head of the present invention, the first holder may be provided with a hole portion made by a laser beam, so that the hole portion can be made easily.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A complex magnetic head, comprising;
   a planar base reference plate for providing a reference position;
   a first head core provided at its side portion with a first support portion positioned with respect to said reference plate and having provided at its leg portion with a first space portion;
   a first coil portion accommodated within said first space portion;
   a second head core provided at its side portion with a second support portion positioned with respect to said reference plate and having provided at its leg portion with a second space portion;
   a second coil portion accommodated within said second space portion; and
   a holder disposed between said first head core and said second head core, having its bottom portion mounted on said reference plate, having one of its side surfaces joined to said first support portion and having the other of its side surfaces joined to said second support portion, for holding said first head core and said second head core;
      wherein said first support portion is joined to one of the side surfaces of said holder which extends for a predetermined length from a predetermined position of said reference plate, and
      wherein said second support portion is joined to the other of the side surfaces of said holder which extends for a predetermined length from a predetermined position of said reference plate.

2. The complex magnetic head as claimed in claim 1, wherein at least one of said first head core and said second head core has a head support portion, and is the head core manufactured by the process of:
   binding a first core material of a U-shaped cross section and a second core material of a flat plate shape to form a tubular core material having two bonded portions between said first and second core materials;
   forming a plurality of grooves in said tubular core material across one of said bonded portions to form a plurality of track surfaces;
   filling said grooves with a fused glass material;
   removing the other of said bonded portions to form a substantially U-shaped core block having a plurality of track surfaces separated by said grooves; and
   cutting said U-shaped core block along each of said grooves into a plurality of magnetic head cores, wherein said step of filling said grooves with said glass material includes the step of placing a head support member on a side surface of said core materials and binding said head support member with said core materials by fusion of a glass material; and wherein said step of cutting said U-shaped core block along each of said grooves into a plurality of magnetic head cores includes the step of cutting said head support member upon the cutting of said U-shaped core block to provide a head support for the head core.

3. The complex magnetic head as claimed in claim 1, wherein said side surfaces have a respective groove thereon to control the intrusion of a bonding agent bonding said holder to a first positioning portion and a second positioning portion.

4. The complex magnetic head as claimed in claim 1, wherein said first coil portion and said second coil portion are formed in an integral unitary structure.

5. The complex magnetic head as claimed in claim 1, wherein a plurality of coil terminals provided at least on said first coil portion are arranged in parallel to the direction of rotation of a magnetic disc.

6. The complex magnetic head as claimed in claim 1, wherein said holder is provided with a hole portion made by a projection on a molding die for manufacturing the holder.

7. The complex magnetic head as claimed in claim 1, wherein said holder is provided with a hole portion made by a laser beam.

* * * * *